United States Patent [19]

Luft et al.

[11] Patent Number: 5,268,440

[45] Date of Patent: Dec. 7, 1993

[54] PROCESS FOR THE PREPARATION OF POLYETHYLENES

[75] Inventors: Gerhard Luft, Mühltal; Maiximilian Dron, Pullach; Norbert Fischer, Rossdorf, all of Fed. Rep. of Germany

[73] Assignee: Peroxid-Chemie GmbH, Hollriegelskreuth, Fed. Rep. of Germany

[21] Appl. No.: 892,385

[22] Filed: May 27, 1992

Related U.S. Application Data

[63] Continuation of Ser. No. 728,023, Jul. 8, 1991, abandoned, which is a continuation of Ser. No. 213,545, Jun. 30, 1988, abandoned.

[30] Foreign Application Priority Data

Jul. 9, 1987 [DE] Fed. Rep. of Germany ....... 3722737

[51] Int. Cl.$^5$ .......................... C08F 2/02; C08F 10/02
[52] U.S. Cl. .................................. 526/352.2; 585/18; 585/502; 526/89
[58] Field of Search ................. 526/89, 352.2; 585/18, 585/502

[56] References Cited

U.S. PATENT DOCUMENTS

| | | | |
|---|---|---|---|
| 2,897,183 | 7/1959 | Christl et al. | 526/352.2 |
| 3,066,115 | 11/1962 | Smith et al. | 526/89 |
| 3,142,666 | 7/1964 | Sleek et al. | 526/352.2 |
| 3,377,330 | 4/1968 | Mortimer | 526/352.2 |
| 3,557,074 | 1/1971 | Buechner et al. | 526/352.2 |
| 3,691,145 | 9/1972 | Gluth et al. | 526/352.2 |
| 3,835,107 | 9/1974 | Stark et al. | 526/352.2 |
| 4,072,811 | 2/1978 | Oosterwijk et al. | 526/352.2 |
| 4,219,674 | 8/1980 | Wolfers et al. | 526/352.2 |

FOREIGN PATENT DOCUMENTS 682174 3/1964 Canada ............................ 526/352.2

OTHER PUBLICATIONS

Ralf et al., Crystalline Olefin Polymers, Part I, Interscience Publs. N.Y. (1965) pp. 312 and 319.

Loft et al., "Radical High Pressure Polymerization of Ethylene with stable . . . ", Angew. Mak. Chem., 160, 193–201 (1988).

*Primary Examiner*—Edward J. Smith
*Attorney, Agent, or Firm*—Felfe & Lynch

[57] ABSTRACT

For the preparation of polyethylenes using a diphenyl ethane derivative as C-C labile polymerization initiator, 1 to 40 mole 3,4-dimethyl-3,4-diphenyl hexane, based on 1 million mole ethylene used, are polymerized at 260° to 400° C. at a pressure of 60,000 to 350,000 kgfa.

9 Claims, No Drawings

PROCESS FOR THE PREPARATION OF POLYETHYLENES

This is a continuation of application Ser. No. 728,023, filed on Jul. 8, 1991, now abandoned, which is a continuation of application Ser. No. 213,545, filed on Jun. 30, 1988, now abandoned.

DESCRIPTION

The invention relates to a process for& the preparation of polyethylenes using a diphenyl ethane derivative as C-C labile polymerisation initiator.

Processes for the polymerisation of ethylene at elevated pressure and at elevated temperature are well known in a number of variants. Sources of radicals such as organic peroxides, oxygen or other substances forming radicals are added to the ethylene to initiate the polymerisation reaction.

For example, U.S. Pat. No. 3,896,099 describes a process for the polymerisation of ethylenically unsaturated monomers in which polymerisation is initiated by free radicals, a 1,1,2,2-tetracarboalkoxydiarylethane being used as initiator. This compound must be used in a quantity of 0.01 to 5% with respect to the reactants. The reaction temperature in this process is between 40 and 200° C., and the duration of a 50% reaction is approximately 30 minutes. The disadvantages of this process are that a large quantity of initiator must be used and the reaction time required is too long for production on an industrial scale.

DE-OS 24 44 252 describes a process for carrying out chemical reactions initiated by radicals, where 1,2-diaryl-1,2-dicyano-1,2-dihalogen ethane compounds are used as radical initiators. The reaction temperature in this process is between 40° and 200° C. and in this case too it is necessary to add the radical initiators in quantities of 0.01 to 3% by wt. of the compounds to be reacted, i.e. in relatively large quantities. The reaction time in this process is also very long, namely between 4 and 6 hours for a 50% conversion, depending on the initiator used.

U.S. Pat. No. 3,066,115 describes a process for the polymerisation of unsaturated compounds containing an ethylenic bond, where at least 0.001% by wt. of a diphenyl ethane compound is used as radical-forming initiator, preferably (alpha-methyl-alpha-ethyl-beta-methyl-beta-ethyl) diphenyl ethane. The temperature in this process is varied in different stages but it is, on the whole, between 125° and 250° C. and the reaction times are on the whole in the region of hours to days.

Moreover, it is well known that the yield also increases during polymerisation as the temperature rises but product discolouration occurs at high temperatures with the initiators normally used, which restricts substantially the utility of the process. Moreover, when high temperatures and pressures are used, decomposition of the ethylene to carbon and methane takes place. This problem occurs particularly at temperatures above 300° C. Methane formation is particularly critical because it can lead to substantial excess pressures which cause explosions and blow out at least the excess pressure valves of the autoclaves in which the reaction takes place. This unwanted decomposition reaction is also strongly exothermal, which contributes to the hazard of using high temperatures during polymerisation.

Another unwanted reaction that can take place at high temperatures is decomposition of the polymerisation initiator which thereby loses its effectiveness for initiating the polymerisation reaction.

The task of the present invention is, therefore, to avoid the above mentioned disadvantages of the state of the art and to provide a process for the preparation of polyethylenes which requires only short polymerisation times with a low initiator consumption, leads to high yields of pure white polymerisation product and prevents potentially dangerous decomposition of the ethylene or polymerisation initiator.

This task is solved according to the invention by a process for the preparation of polyethylene using a diphenyl ethane derivative as C-C labile polymerisation initiator, which is characterized in that polymerisation is carried out with 1 to 40 mole 3,4-dimethyl-3,4-diphenyl hexane, based on 1 million mole ethylene used, at 260° to 400° C. and at a pressure of 60,000 to 350,000 kPa.

By virtue of this process it is possible to obtain particularly high polyethylene yields with extremely short residence times of the reaction mixture in the reactor, said polyethylene having the normal white colour and exhibiting no discolouration. Polyethylene produced according to the invention has a low to moderate density (0.85 to 0.935 g cm$^{-3}$) and a high melt index. Moreover, the consumption of initiator in the process according to the invention is extremely low and no decomposition of the ethylene takes place.

In a preferred embodiment of the invention, polymerisation is carried out with 2 to 10 mole 3,4-dimethyl-3,4-diphenyl hexane, based on 1 million mole ethylene used. In another preferred embodiment, polymerisation is carried out at a temperature of 300° to 360° C. Moreover, polymerisation is carried out preferably at a pressure of 150,000 to 200,000 kPa.

The facilities and operating procedures of the kind described, for example, in 'Ullmanns Enzyklopädie der technischen Chemie', volume 19, 4th. edition, pages 167 to 226, Verlag Chemie, ditto volume 3, 4th edition, pages 321 to 326, or Chem.-Ing.-Techn. 51 (1969), pages 960 to 969, normally used for polymerisation of ethylene at elevated pressure and at elevated temperature are suitable for carrying out the process according to the invention.

In a preferred embodiment of the invention polymerisation is carried out in a stirred autoclave in which the temperature of the inflowing ethylene is regulated by means of a heat exchanger.

The residence time of the reaction mixture in the reactor is preferably 10 seconds to 120 seconds, and particularly preferably 20 to 60 seconds. This short residence time in the reactor is a great advantage of the invention. In a plant of an appropriate size, it leads to improved utilization of the plants and hence to increased production for a given plant size. In a preferred embodiment of the invention, the polymer and unreacted ethylene are separated by release of pressure behind the reactor.

Polyethylenes produced according to the invention can be used for all well known and conceivable applications of polyethylene and can, in particular, be used as flow improvers, polyethylene wax or as an internal lubricant for thermoplastics on the basis of the high melt index and the relatively low molecular weight. Until now, it has been possible to produce polyethylenes of this kind with a low molecular weight and a high melt index only by using low pressures and hence large quantities of initiator.

The purpose of the following examples is to explain the invention in more detail.

Example 1

A mixture of 1 million parts by wt. ethylene/hour and 95 parts by wt. 3,4-dimethyl-3,4-diphenyl hexane (CCDFH)/hour (corresponding to 10 mole, based on 1 million mole-ethylene) under a pressure of 170,000 kPa with a temperature of 20° C. is introduced continuously into the reactor. The residence time being 30 seconds and the temperature of the reactor jacket being kept constant at 235° C., the reaction mixture reaches a temperature of 358° C. as a result of the heat of reaction liberated. The other conditions are listed in Table 1. If the reactor conditions are stable, 587,000 parts by wt./hour of a polyethylene having the usual white colour and exhibiting no discolouration are obtained in this way. It has a density of 0.8890 g/cm³ according to DIN 53479 and a melt index of 11,300 g/10 minutes measured according to DIN 53735 at 125° C. with 0.325 kgf. A low initiator consumption of 0.16 g initiator per kg of polyethylene formed is achieved.

Example 2

A mixture of 1 million parts by wt. ethylene/hour and 76 parts by wt. 3,4-dimethyl-3,4-diphenyl hexane (CCDFH)/hour (corresponding to 8 mole, based on 1 million mole ethylene) under a pressure of 170,000 kPa, with a temperature of 20° C., is introduced continuously into the reactor. The residence time being 30 seconds and the temperature of the reactor jacket being kept constant at 240° C., the reaction mixture reaches a temperature of 340° C. as a result of the heat of reaction liberated. 489,000 parts by wt./hour of a polyethylene having the usual white colour and exhibiting no discolouration are obtained in this way. It has a density of 0.8930 g/cm³ according to DIN 53479 and a melt index of 5,200 g/10 minutes measured according to DIN 53735 at 125° C with 0.325 kgf. The initiator consumption is 0.16 g initiator per kg of polyethylene.

Comparative Example 1A

A mixture of 1 million weight units of ethylene/hour and 1387.5 parts by wt. t-butyl-per-2-ethyl hexanoate (TBPEH)/hour (corresponding to 180 mole, based on 1 million mole ethylene) under a pressure of only 110,000 kPa is fed in continuously at the entrance of the same reactor. At a polymerisation temperature of 230° C. the polyethylene formed has a density of 0.9200 g/ml and a melt index of 54.7 g/10 minutes measured according to DIN 53735 at 190° C. with 2.16 kgf. A quantity of only 152,000 parts by weight polymer is obtained. 9.1 g initiator must be introduced per kg of polymer formed.

Comparative Example 2A

Operations are carried out in the same way as in comparative example 1A, but 652 parts by wt. t.butyl perpivalate (TBPPI)/hour (corresponding to 105 mole, based on 1 million mole ethylene) are used and the pressure is lowered to 90,000 kgfa. At the same polymerisation temperature of 230° C., 70,000 parts by wt. of a polyethylene are obtained, with a density of 0.9150 g/ml and a melt index of 21.6 g/10 minutes, measured according to DIN 53735 at 190° C. with 2.16 kgf. The initiator consumption is 9.3 g initiator per kg of polyethylene formed.

Comparative Example 3A

Operations are carried out in the same way as in comparative example 1A, but 32 parts by wt. t.butyl hydroperoxide (TBHP)/hour (corresponding to 10 mole, based on 1 million mole ethylene) are used and the pressure is kept at 170,000 kgfa. At a polymerisation temperature of 287° C., 343,000 parts by wt. of a polyethylene are obtained, with i a density of 0.9065 g/ml and a melt index of 480 g/10 minutes, measured according to DIN 53735 at 190° C. with 2.16 kgf. 0.1 g of the initiator is used per kg of polymer formed. The polymer exhibits brownish discolouration in some places.

TABLE 1

| Example | 1 | 2 |
|---|---|---|
| Initiator | CCDFH | CCDFH |
| Initiator Concentration at the entrance (mole ppm) | 10 | 8 |
| Pressure (kPa) | 170000 | 170000 |
| Reactor Temperature (°C.) | 358 | 340 |
| Reactor Jacket Temperature (°C.) | 235 | 240 |
| Polyethylene Yield (%) | 58.7 | 48.9 |
| Initiator Consumption (g I/kg PE) | 0.16 | 0.16 |
| Melt Index (g/10 minutes) | 11.300 | 5.200 |
| Density (g/ml) | 0.8890 | 0.8930 |

TABLE 2

| Comparative Example | 1A | 2A | 3A[1) |
|---|---|---|---|
| Initiator | TBPEH | TBPPI | TBHP |
| Initiator Concentration at the entrance (mole ppm) | 180 | 105 | 10 |
| Pressure (kPa) | 110000 | 90000 | 170000 |
| Reactor Temperature (°C.) | 230 | 230 | 287 |
| Reactor Jacket Temperature (°C.) | 180 | 200 | 170 |
| Polyethylene Yield (%) | 15.2 | 7.0 | 34.3 |
| Initiator Consumption (g I/kg PE) | 9.1 | 9.3 | 0.1 |
| Melt Index (g/10 minutes) | 54.7 | 21,6 | 480 |
| Density (g/ml) | 0.9200 | 0.9150 | 0.9065 |

1)With the addition of 4 parts by wt. but-1-ene

What is claimed is:

1. A process for the preparation of polyethylenes which comprises polymerising a monomer stream consisting essentially of ethylene at a temperature which reaches the range of 300° to 360° C., at a pressure of from 60,000 to 350,000 kPa, using, as a polymerization initiator, from 1 to 40 moles of 3,4-dimethyl-3,4-diphenyl hexane per million moles ethylene.

2. A process according to claim 1, in which 5 to 10 moles of 3,4-dimethyl-3,4-diphenyl hexane per 1 million moles of ethylene are used.

3. A process according to claim 1, in which polymerisation is carried out at a pressure of from 150,000 to 200,000 kPa.

4. A process according to claim 1, in which the polymerisation is carried out in stirred autoclave or in a tubular reactor in which the temperature of the inflowing ethylene is regulated by means of a heat exchanger.

5. A process according to claim 4, in which the residence time of the reaction mixture in the reactor is from 10 seconds to 120 seconds.

6. A process according to claim 5, in which the residence time is from 20 seconds to 60 seconds.

7. A process according to claim 4, in which the polyethylene is separated from unreacted ethylene by release of pressure behind the reactor.

8. A process according to claim 5, in which the polymerisation is carried out at a pressure of from 150,000 to 200,000 kPa, using from 5 to 10 moles of 3,4-dimethyl-3,4-diphenyl hexane per 1 million moles of ethylene.

9. A process according to claim 8, in which the residence time of the reaction is from 20 seconds to 60 seconds and the polyethylene product is separated from unreacted ethylene by release of pressure behind the reactor.

* * * * *

UNITED STATES PATENT AND TRADEMARK OFFICE
CERTIFICATE OF CORRECTION

PATENT NO. : 5,268,440
DATED : December 7, 1993
INVENTOR(S) : Gerhard Luft, et al.

It is certified that error appears in the above-indentified patent and that said Letters Patent is hereby corrected as shown below:

On the cover page: Correct the name of the inventor i.e. change "Maiximilian Dron" to -- Maximilian Dorn --.

Signed and Sealed this

Eleventh Day of April, 1995

*Attest:*

BRUCE LEHMAN

*Attesting Officer*  *Commissioner of Patents and Trademarks*